(12) United States Patent
Feuerriegel et al.

(10) Patent No.: US 11,085,696 B2
(45) Date of Patent: Aug. 10, 2021

(54) DRYING SYSTEM WITH IMPROVED ENERGY EFFICIENCY AND CAPACITY CONTROL

(71) Applicant: GEA PROCESS ENGINEERING A/S, Søborg (DE)

(72) Inventors: Bernd Feuerriegel, Berlin (DE); Lorenzo Bellemo, Copenhagen N (DK)

(73) Assignee: GEA PROCESS ENGINEERING A/S

( * ) Notice: Subject to any disclaimer, the term of this patent is extended or adjusted under 35 U.S.C. 154(b) by 10 days.

(21) Appl. No.: 16/461,485

(22) PCT Filed: Nov. 18, 2016

(86) PCT No.: PCT/DK2016/050378
§ 371 (c)(1),
(2) Date: May 16, 2019

(87) PCT Pub. No.: WO2018/091049
PCT Pub. Date: May 24, 2018

(65) Prior Publication Data
US 2019/0346205 A1    Nov. 14, 2019

(51) Int. Cl.
*F26B 19/00*    (2006.01)
*F26B 21/08*    (2006.01)
(Continued)

(52) U.S. Cl.
CPC ............ *F26B 21/086* (2013.01); *F26B 21/04* (2013.01); *F26B 21/10* (2013.01); *F26B 21/12* (2013.01); *F26B 23/001* (2013.01)

(58) Field of Classification Search
CPC ........ F26B 21/086; F26B 21/04; F26B 21/10; F26B 21/12; F26B 23/001; F26B 23/005; Y02B 30/52; Y02P 70/10
(Continued)

(56) References Cited

U.S. PATENT DOCUMENTS 3,965,696 A    6/1976   Thomason
4,173,924 A *  11/1979  Bradshaw ............... B05B 16/60
                                                    454/52
(Continued)

FOREIGN PATENT DOCUMENTS

CN    202199134 U    4/2012
CN    202521937 U    11/2012
(Continued)

*Primary Examiner* — John P McCormack
(74) *Attorney, Agent, or Firm* — Condo Roccia Koptiw LLP

(57) ABSTRACT

The invention relates to a drying system (1) comprising a drying plant (2) and a heat pump assembly (3) comprising one or more heat pumps operating with a primary fluid and being connected to at least two heat sources and at least one heat sink by means of a number of heat exchangers in a fluid network, in which a secondary fluid circulates. The heat sources may comprise dew point dehumidification in at least one heat exchanger (41) of process gas entering the drying plant; and recovery in another heat exchanger (42) of latent and/or sensible heat from exhaust gas leaving the drying plant. The heat sink may comprise pre-heating in a heat exchanger (51) of process gas used within the plant. Further, a method of integrating a heat pump assembly into a drying system is devised. By the invention, it is possible to increase the capacity of the drying plant while reducing the specific energy demand.

20 Claims, 5 Drawing Sheets

(51) Int. Cl.
*F26B 21/04* (2006.01)
*F26B 21/10* (2006.01)
*F26B 21/12* (2006.01)
*F26B 23/00* (2006.01)

(58) Field of Classification Search
USPC .......................................... 34/515, 514, 86
See application file for complete search history.

(56) References Cited

U.S. PATENT DOCUMENTS

| | | | | |
|---|---|---|---|---|
| 4,780,967 | A * | 11/1988 | Mucic | F26B 23/005 34/86 |
| 5,964,986 | A | 10/1999 | Meili | |
| 2003/0136140 | A1* | 7/2003 | Maeda | F25B 5/04 62/271 |
| 2005/0204755 | A1* | 9/2005 | Nishiwaki | D06F 58/206 62/93 |
| 2009/0113752 | A1* | 5/2009 | Weir | F26B 21/06 34/282 |
| 2016/0107135 | A1* | 4/2016 | Verbraak | B01J 8/0242 34/406 |
| 2016/0145793 | A1* | 5/2016 | Ryoo | D06F 58/24 34/499 |

FOREIGN PATENT DOCUMENTS

| | | | |
|---|---|---|---|
| CN | 103277985 | A | 9/2013 |
| CN | 103322725 | A | 9/2013 |
| CN | 203642644 | U | 6/2014 |
| CN | 105043077 | A | 11/2015 |
| DE | 4003446 | A1 | 8/1991 |
| DE | 200 08 740 | U1 | 8/2000 |
| EP | 1 051 372 | A1 | 11/2000 |
| FR | 1 391 485 | A | 3/1965 |
| FR | 2 535 445 | A1 | 5/1984 |
| GB | 2 052 704 | A | 1/1981 |
| JP | S57-16777 | A | 1/1982 |
| JP | S61-291871 | A | 12/1986 |
| JP | H07-4845 | A | 1/1995 |
| JP | H11-63818 | A | 3/1999 |
| JP | 2002-257377 | A | 9/2002 |
| JP | 2003-130493 | A | 5/2003 |
| JP | 2010-151437 | A | 7/2010 |
| JP | 2012-075824 | A | 4/2012 |
| JP | 2012-137201 | A | 7/2012 |
| JP | 2013-050287 | A | 3/2013 |
| JP | 2013-234771 | A | 11/2013 |
| KR | 2010 0101266 | A | 9/2010 |
| WO | WO 9940045 | A1 | 8/1999 |
| WO | WO-0036344 | A1 * | 6/2000 ............... F25B 5/02 |
| WO | WO 2011/107284 | A1 | 9/2011 |

\* cited by examiner

DRYING SYSTEM WITH IMPROVED ENERGY EFFICIENCY AND CAPACITY CONTROL

CROSS REFERENCE TO RELATED APPLICATIONS

This application is the National Stage Entry under 35 U.S.C. § 371 of Patent Cooperation Treaty Application No. PCT/DK2016/050378, filed 18 Nov. 2016, the contents of which are hereby incorporated by reference herein.

FIELD OF INVENTION

The present invention in a first aspect relates to a drying system comprising a drying plant and a heat pump assembly, the heat pump assembly including at least one heat pump operating with a primary fluid and being connected to at least two heat sources and at least one heat sink by means of a number of heat exchangers in a fluid network, in which a secondary fluid circulates. The invention furthermore relates to a method for integrating said heat pump assembly by means of said fluid network into a drying system and to operate said fluid network such as to increase the capacity of the drying plant and at the same time decrease the specific energy demand per weight unit of dried product.

BACKGROUND OF THE INVENTION

Drying is a mass transfer process consisting of the removal of a solvent, the solvent being for example water and/or organic liquids, by evaporation from a solid, semi-solid or liquid product to be dried (the product to be dried hereinafter designated the feed), all ingredients dispersed in the feed other than solvent being the total solids (TS) of the feed, and the solvent may be free and/or bound in the feed TS. A source of heat and an agent to remove at least partly the vapor produced by the process are often involved. To vaporize solvent contained in a feed, the latent heat of vaporization must be supplied. There are, thus, two important process-controlling factors that typically enter into the unit operation of drying: (a) transfer of heat to provide the necessary latent heat of vaporization, (b) movement of solvent and/or solvent vapor through the product to be dried and then away from it to effect separation of at least a part of the solvent from the TS. In the most common case, a gas stream, e.g. air (this gas stream hereinafter designated air or process gas), supplies the heat by convection and carries away the vapor, e.g. in case of water as humidity. This procedure is applied in many different drying processes comprising, but not limited to, spray drying, flash drying, swirl fluidize drying, rotary drying, belt drying and convection drying.

A spray drying process is defined as a process where a feed a) having either a liquid or pasty consistency, b) being able to be transported or preferably pumped, c) being able to be dispersed in a gas stream, d) consisting of a solvent and liquid or pasty or semi-solid or solid substances dispersed in that solvent, is brought in contact with a process gas entry, which was heated beforehand in order to provide thermal energy to the feed for the purpose of evaporation of a part of the solvent, and subsequently to absorb the evaporated part of the solvent to carry it out of the spray drying process at the process gas exhaust. The dispersed substances and some residues of the solvent form a final powder, which is collected from the spray drying process, whilst some intermediate and/or final powder might be recycled inside the spray drying process.

Spray drying plants may comprise devices for air handling for all air streams needed for the process (i.e. air heater, supply fan, dehumidifiers, coolers, and systems for exhaust air cleaning etc., which equipment in the present context is designated the air handling unit), product handling (i.e. feed pump, atomizer etc.), air disperser, drying chamber, heat recovery, and powder recovery. All systems can be provided with pre- and post-treatment equipment, for example evaporators, homogenizers, fluid bed dryer/cooler, agglomerator, de-duster and conveyor etc., so that the plant meets individual product specifications, operational safety, and environmental protection requirements. Also the plants are available in open, closed, semi-closed and aseptic cycle versions.

Many types of products may be spray dried within dairy, food, chemical, agro-chemical, energy, biotechnology, pharmaceutical, healthcare and many more applications.

Widely varying drying characteristics and quality requirements of the thousands of products to be spray dried determine the selection of the atomizing technology (i.e. nozzles, rotary parts etc.), the most suitable airflow pattern, the drying chamber design and the spray drying plant configuration including the process parameters.

Spray drying plants, for example for the production of food powders, are usually quite large energy intensive installations with a high specific thermal energy consumption on a high temperature level of above for example 250° C., which is therefore mostly provided by a primary energy combustion process with high $CO_2$ emissions. The combustion process provides heating energy to a process gas—mostly ambient air—at a temperature as high as needed for the entry into the drying process, mostly between about 150° C. and 230° C., sometimes even higher. The process gas provides the energy to evaporate the solvent—most commonly water—during the drying process and leaves the process as warm exhaust gas on a low temperature level of mostly between 65-80° C. This low temperature level of the exhaust gas would only allow a limited heat recovery by heat transfer into the drying process as over 60-70% (depending on the plant configuration) of the necessary heating energy is needed on a higher temperature level. Commonly over about 60% of the heating energy is subsequently lost with the exhaust gas, particularly in the form of latent heat. Therefore, the specific energy demand related to output of dried product is usually over 1.1 kWh per kg dried product.

However, the process gas does not solely provide the energy to evaporate the solvent but has simultaneously to remove the evaporated solvent whilst fulfilling the requirements on product quality for the drying process. Therefore, the drying capacity of the process gas is inversely proportional to the partial pressure of solvent in the process gas entering the drying process, and variations of that partial pressure of solvent in the entering process gas have a strong impact on the efficiency of the drying process. In the following the partial pressure of solvent in the process gas is designated as humidity and a reduction of that humidity to a targeted level designated as dehumidification. As spray drying processes mostly employ open cycle configurations, the diurnal and seasonal variations of the local weather conditions strongly affect the specific energy consumption and capacity of the drying process.

A number of technical solutions for reducing the specific energy consumption and/or increasing the production capacity of spray drying plants have already been investigated.

In WO 2011/107284 A1 a spray drying apparatus is disclosed, wherein heat is transferred by direct heat exchange from the exhaust gas for the purpose of regenerating an adsorption dehumidification device.

The use of a heat pump for heat transfer from exhaust gas for the single task of pre-heating a process gas in a spray-drying facility is a well-known concept (Jensen, J. K et al. (2015). Exergoeconomic optimization of an ammonia-water hybrid absorption-compression heat pump for heat supply in a spray drying facility. International Journal of Energy and Environmental Engineering, 6, 195-211).

The prior art solutions, however, fall short of maximizing production while concomitantly minimizing specific energy consumption throughout the entire service time of the drying plant and during variable operational conditions, such as climatic fluctuations.

SUMMARY OF THE INVENTION

In view of the above, it is an object of the present invention to provide a technical solution for simultaneously reducing the specific energy consumption and increasing the capacity of drying processes notwithstanding varying operating conditions.

To meet this object, a drying system is provided comprising a drying plant and a heat pump assembly, the heat pump assembly including at least one heat pump operating with a primary fluid and being connected to at least two heat sources and at least one heat sink by means of a number of heat exchangers in a fluid network, in which a secondary fluid circulates.

The term "fluid network" should be taken to designate the integral structure created by the connection between the heat pump assembly, heat sources and heat sinks by means of pipelines, control devices and heat exchangers.

Such an integrated fluid network is capable of strongly reducing and possibly eliminating fluctuations of production capacity typically caused by humidity variations of the process gas entering the drying system and for open cycle configurations especially caused by weather variations throughout the year.

According to a preferred embodiment, the above-mentioned at least two heat sources comprise dew point dehumidification in at least one of said heat exchangers of process gas entering the drying plant; and recovery in at least one of said heat exchangers of latent and/or sensible heat from exhaust gas leaving the drying plant.

In another preferred embodiment, the above-mentioned at least one heat sink comprises pre-heating in at least one of the heat exchangers of process gas used within the drying plant.

The heat pump assembly is integrated in the drying system such as to a) guarantee that the process gas entering the plant is dehumidified to a targeted level, and b) the heat sinks connected to the heat pump or heat pumps of the heat pump assembly are heated to the required temperature levels. The most stringent condition between these two sizing criteria shall be satisfied at all times. Therefore, heat recovery from the exhaust gas leaving the plant is used at times when the dehumidification load is not sufficient to provide enough heat to the heat sinks via the heat pump. Accordingly, it is a characteristic of the hereby presented heat pump integration to balance the two, or more, heat sources throughout the whole year, resulting in the following scenarios: a) the process gas entering the plant and the exhaust gas leaving the plant are both dehumidified to a targeted level, b) the process gas entering the plant is dehumidified to a targeted level while only sensible heat is recovered from the exhaust gas leaving the plant, c) only dehumidification of the process gas entering the plant is performed to a targeted level, d) only sensible and/or latent heat from the exhaust air leaving the plant is recovered. Notice that the last two scenarios use only one of the two heat sources for providing the whole heating load.

In a further embodiment, an additional heat recovery system using a secondary fluid, preferably water, for transferring heat from the exhaust gas for pre-heating the process gas is included. This solution facilitates the recovery of heat, mostly sensible heat, from the exhaust gas when the amount of heat required by the heat pump system is significantly smaller than the maximum heat recovery possible, which could result in difficulties to operate the fluid network. At the same time, the pre-heating provided by this additional heat recovery system permits to raise the process gas temperature prior to further pre-heating provided by the fluid network, with consequent reduction of the heating load required from the heat pump.

In a further embodiment, a heat sink is provided in the form of pre-heating of the process gas in at least one of the heat exchangers prior to the dew point dehumidification in order to prevent freezing in process gas entry areas.

In a further embodiment, a heat sink is provided in the form of heating of process gas, or another gas, in at least one of the heat exchangers for regeneration of a desiccant from a desiccant unit, wherein the desiccant absorbs water from the process gas after the dew point dehumidification. An adsorption dehumidification device may thus be provided subsequently to the dew point dehumidification of the invention, where a desiccant absorbs water from the process gas at a constantly low gas temperature of for example between 20 and 6° C. and a humidity of for example between 15 and 6 g/kg to dehumidify the process gas entry or a part of the process gas to humidity levels corresponding to dew points below 0° C. but with no frost formation, for the purpose of further increasing the drying capacity of the spray drying process. As the outlet conditions after the dew point dehumidification can be maintained at a targeted humidity level independently of diurnal or seasonal variations of local weather conditions, the adsorption dehumidification can be sized for nearly constant conditions, which allows using a much smaller adsorption desiccant equipment compared to conventional installations and/or lower regeneration air temperatures and/or regeneration air flow rates. The thermal energy to heat a process gas stream used for the regeneration of the desiccant is provided by the heat pump of this invention and may be regarded as a heat sink outside the spray drying process sensu stricto, wherefore the heat pump is sized in such way that this regeneration heat may be provided in addition to the heating capacity of the heat pump needed for that process. This results in an increased heat recovery rate from the exhaust gas and it provides an increased drying capacity of the spray drying process.

In a further embodiment, a heat source is provided in the form of cooling of process gas after regeneration of a desiccant sorbent in at least one of the heat exchangers, said desiccant sorbing the solvent vapor from the process gas.

According to a further embodiment, a heat source is provided in the form of cooling of a process gas side stream in at least one of the heat exchangers, optionally for cooling and/or pneumatic transport of a final and/or intermediate dried product.

In a further embodiment, the chilling capacity of the fluid network can be used to cool a part of the process gas after an adsorption dehumidification, wherein the process gas is heated due to the adsorption process itself, to accommodate various cooling needs in the spray drying process, for example to cool down the powder by means of cold process gas with low relative humidity.

In a preferred embodiment, the drying plant of the drying system comprises a spray drying apparatus connected to at least one pre-treatment unit and at least one exhaust heat recovery unit.

Thus, a flexibly controlled fluid network system with a heat pump is integrated into a spray drying process. For the purpose of raising the temperature level of available thermal energy for preheating the process gas, the fluid network is variably combined with a dehumidification system for the process gas entry for the purpose of capacity control by providing the needed amount of cooling energy for the above mentioned dew point dehumidification—whilst this cooling energy is recovered through the heat pump—and a heat recovery system for the process gas exhaust possibly recovering a large part of the latent heat of the evaporated solvent. This results simultaneously in a high heat recovery rate and a remarkably increased drying capacity, with proportionally increased output of dried product and lower specific energy demand as well as smaller $CO_2$ footprint per unit of dried product in comparison to conventional spray drying processes. It should be noted that, in the present invention, a part of the conventional heat consumption is replaced by electricity that may be produced with a smaller environmental impact. By the present invention, the specific energy demand of the drying process related to output of dried product can be reduced by over 40% with state of the art components and even more with emerging solutions compared to conventional drying processes.

In a further embodiment, the spray drying apparatus comprises a drying chamber with a primary process gas inlet for drying gas connected to at least one of the heat exchangers and a secondary process gas inlet at an outlet from the drying chamber for transportation of dried material connected to at least one of the heat exchangers.

In a further embodiment, the spray drying apparatus furthermore comprises at least one after-treatment unit provided with at least a tertiary gas inlet connected to at least one of said heat exchangers, preferably also a quaternary gas inlet connected to at least one of said heat exchangers.

The fluid network using a heat transfer fluid which flows through a number of connected fluid loops accordingly may be integrated into multiple areas of the spray drying process, where heat transfer processes take place, with the aim to recycle as much as possible of the thermal energy by flexibly adapting the temperature levels of the fluid loops to the available heat sources and heat sinks.

In a further embodiment, the fluid network is used to connect the heat pump to other process plants than the spray dryer (e.g. evaporation line, concentrate cooling, feed pre-heater, pasteurization line, etc.) for covering cooling and/or heating needs accordingly to the required temperature levels, for further reducing the energy consumption in the whole plant including upstream and downstream processing equipment.

In a further embodiment, a heat source is provided in the form of cooling an auxiliary fluid stream being a gas or a liquid.

In a further embodiment, a heat sink is provided in the form of heating an auxiliary fluid stream being a gas or a liquid.

In a further embodiment, the heat pump assembly comprises at least one high temperature heat pump, the heat pump or heat pumps being able of simultaneously providing chilling energy of a temperature below 20° C. at the respective cold side and heating energy at the respective hot side on different temperature levels for different heat sinks, comprising at least one intermediate level between about 35-90° C. and a high temperature level above 100° C., according to the limitations set by the specific heat pump.

In a further embodiment, the drying system is a closed cycle system in which the process gas is adapted to be recycled to the entry of the drying plant, and the at least two heat sources comprise dehumidification of process gas in one heat exchanger and an auxiliary stream in another heat exchanger.

In one embodiment of such a closed cycle system, the heat sink comprises pre-heating of process gas used within the drying plant in at least one of the heat exchangers.

In a further embodiment, the drying system is a closed cycle system in which the process gas is adapted to be recycled to the entry of the drying plant, and a desiccant unit is provided, said at least two heat sources comprising dehumidification of process gas in one heat exchanger and a regeneration air stream from said desiccant unit in another heat exchanger. The heat sink may comprise heating of the regeneration air stream to the desiccant unit in yet another heat exchanger.

In a further embodiment, the heat pump assembly comprises at least one control device for the at least one heat pump and piping connecting the at least one heat pump with the heat exchangers. Advantageously, the piping is provided with at least one control device for the operation of the secondary fluid.

To meet the aforementioned object, a method for integrating a heat pump assembly operating with a primary fluid into a drying system comprising a drying plant is provided, said method comprising the steps of: connecting by means of a number of heat exchangers in a fluid network, in which a secondary fluid circulates, a) at least two heat sources, said heat sources comprising dew point dehumidification of process gas entering the drying plant, and recovery of latent and/or sensible heat from exhaust gas leaving the drying plant, respectively, and b) at least one heat sink comprising pre-heating of process gas used within the drying plant, to the heat pump assembly; and controlling said fluid network by flow and temperature in respective parts of said fluid network to manage transfer of heat from the heat sources to the fluid and from the fluid to the heat sinks with a view to optimizing the capacity of the drying plant and the specific energy demand per weight unit of product.

The system is thus controlled by flow, flow direction, pressure and temperature in respective parts of said fluid network to manage transfer of heat from each of the different heat sources to the fluid, from the fluid to the cold evaporation side of the heat pump, from any hot side of the heat pump to the fluid, and from the fluid to each of the different heat sinks in the respective parts of said fluid network.

In a preferred embodiment, the drying system is an open cycle system and account is taken of the absolute humidity and temperature of the ambient air at the location of the drying system when optimizing the capacity of the drying plant and the specific energy demand per weight unit of product.

In an alternative embodiment, the drying system is a closed cycle system, and an auxiliary stream is supplied.

In a further embodiment, a desiccant unit is provided, and a regeneration air stream is supplied through the desiccant unit.

In a further embodiment, the heat pump assembly is provided as a retrofit appliance incorporating a control device and piping, and the method further comprises the steps of connecting the piping to the heat exchangers to form the fluid network.

The fluid network with multiple integrated loops forming a loop system is flexibly controlled by a number of control devices, e.g. flow controllers, temperature controllers, pressure controllers, pipelines, vessels, pumps, heat exchangers, and/or valves, in such way that single and/or combined loops can be controlled by flow, flow direction, pressure and temperatures. Therefore, it can flexibly be adapted to varying thermal requirements of the drying process resulting from different operating conditions, the conditions depending on or independently influenced by a) the type of product to be dried, b) the capacity as amount per time unit of product to be dried, c) drying plant conditions other than drying of product, d) diurnal and seasonal variations of the process gas inlet temperature and humidity with the result that temperature and humidity conditions of the process gas entering into the drying plant after the dew point dehumidification are to be considered as more or less constant on an adjustable and controlled level. This way of controlling the fluid network therefore always provides possibly varying chilling capacity needed for dew point dehumidification of the process gas entry to keep the drying air humidity at all times under a controlled value. At the same time, the cold side of the heat pump provides sufficient cold dry process gas if needed for different cooling purposes in the spray drying process, e.g. for cooling and/or pneumatic transport of the final and/or intermediate powder. Together, this results in a considerable drying capacity increase of the spray drying process.

The chilling energy for the dew point dehumidification of the process gas entry is provided by a part of the integrated loop system using the cooled fluid which is the said secondary fluid, the cooling of that fluid provided by the cold evaporation side of the heat pump, which allows to recycle the thermal energy from a low temperature level and to make it available on higher temperature levels. The heat pump may require more chilling capacity for heating purposes than needed for the desired dew point dehumidification of the process gas entry. Variations in levels of dew point dehumidification of the process gas entry can be adapted by modifying the flow and/or temperature of the cold heat transfer fluid of the integrated loop system. Additional heat can at least partly obtained from the process gas exhaust in order to recover thermal energy on such low temperature level that it would otherwise had been considered lost waste energy. The combined use of thermal loads for the dew point dehumidification of the process gas entry and the cooling of the process gas exhaust together in one integrated fluid network considerably increases the heat recovery level in comparison to conventional spray drying processes while also providing an increased production capacity.

The fluid network is controlled so that enough heat is extracted from the heat sources for providing the required amount of heat for pre-heating the process air to the maximum temperature allowed by the heat pump, in accordance to the drying process requirements, and possibly pre-heating also additional and/or auxiliary streams. Both the dew point dehumidification of the process gas entry and the heat recovery from the process gas exhaust as well as all heat transfer processes, where a process gas side stream is cooled by the fluid network, are to be considered as heat sources of the spray drying process. Heat sinks of the spray drying process are also all heat transfer operations, where the process gas entry or other process gas side streams, which are necessary for the operation of the spray drying process, are heated by the fluid network system, for example an initial preheating of the process gas entry to at least above 6° C., when the ambient air is below for example 4° C. due to diurnal or seasonal conditions, in order to prevent freezing in the process gas entry areas.

Usually, the energy balance of the spray drying process shows that more thermal energy is available from low temperature heat sources of the spray drying process compared to the thermal energy, which is transferrable to the heat sinks of the spray drying process, as the limiting factor for this heat recovery is the maximum temperature which can be provided by the heat pump.

The heat pump is sized to provide at any time at least such preheating capacity which is possible to transfer to the heat sinks of the spray drying process in accordance with the available temperature levels provided by the hot side of the heat pump. If the heat pump should additionally provide thermal energy for other heating purposes outside the spray drying process, the heat pump can be sized accordingly. Subsequently, the heat pump is sized so that it may provide at any time at least such chilling capacity, which is needed for the dew point dehumidification of the process gas entry in order to increase the drying capacity of the spray drying process. Any need for additional thermal load for providing the required heating capacity resulting from the sizing of the heat pump can consequently be covered by recovering thermal energy from heat sources of the spray drying process or for other cooling purposes outside the spray drying process.

BRIEF DESCRIPTION OF THE DRAWINGS

The invention will be described in more detail below by means of non-limiting examples of presently preferred embodiments and with reference to the schematic drawings, in which.

DETAILED DESCRIPTION OF THE INVENTION

Figure 1:
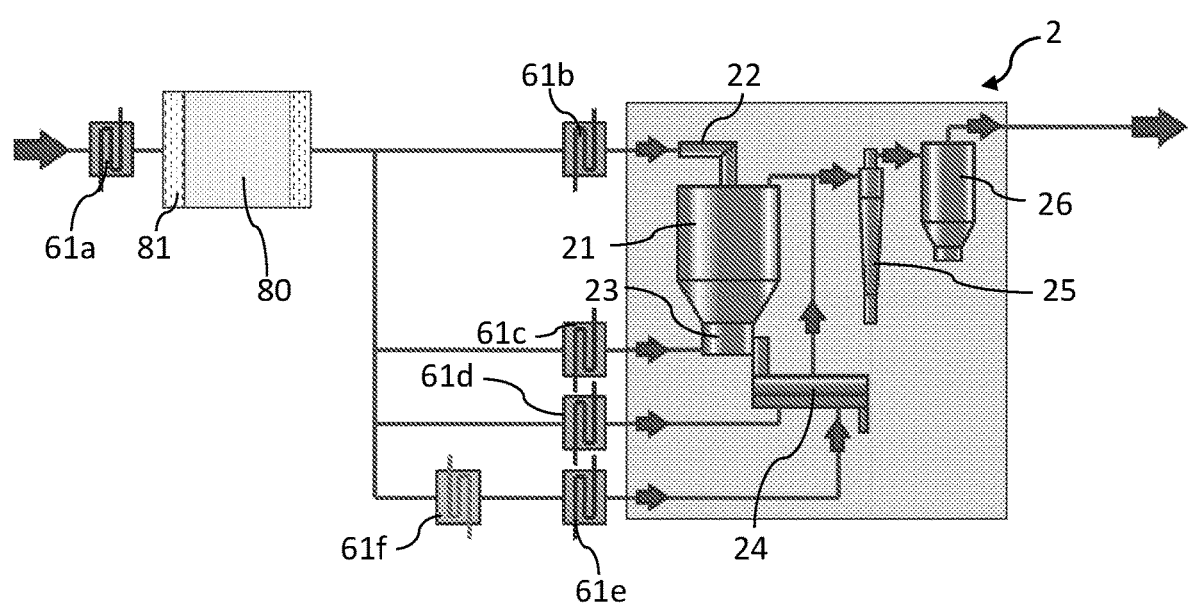
FIG. 1 shows a schematic view of a prior art drying system.

FIG. 1 shows a schematic view of the main components of a drying plant comprising a spray drying apparatus 2.

In a manner known per se, the spray drying apparatus 2 comprises a drying chamber 21 and a primary inlet 22 for process air/gas, typically including an air/gas disperser. It is noted that the term "gas" will be used alongside with the term "air" as "air/gas" and is to be interpreted as encompassing any gas that is suitable as process gas in such a spray drying apparatus.

The drying chamber 21 also incorporates atomizing means (not shown), such as nozzles and/or an atomizer wheel. The term "drying plant" is intended to encompass such plants in which a powdery or particulate material is processed. The material may either be provided as a feed of powdery or particulate material, or as a liquid feed to be dried. The drying plant is also intended to cover cooling of the particulate material. In addition to or alternatively to the spray drying apparatus described, such a plant could include one or more fluid beds, flash dryers etc.

At the lower end of the drying chamber 21, an outlet 23 for dried or semi-dry intermediate material is provided. In the shown spray drying apparatus 2, an after-treatment unit in the form of vibrating or static fluid bed 24 is provided. At one end, the vibrating or static fluid bed 24 receives dried or semi-dried material from the outlet 23 of the drying chamber 21 for further treatment of the material, which is then to be collected at an outlet at the other end of the vibrating or static fluid bed 24.

Furthermore, the spray drying apparatus 2 comprises a series of powder recovery units including a number of filter units, cyclones and/or bag filters, or any combination thereof. In the prior art system of FIG. 1 one cyclone 25 is shown, to which spent process gas with particles entrained in the process gas is conducted. The process gas conducted to the cyclone 25 can as shown originate from the drying chamber 21 or the vibrating or static fluid bed 24. The cyclone 25 is connected to a bag filter 26, both with the purpose to recover or collect particles from the spent process gas (not shown), from which exhaust gas is discharged, either to the surroundings or to be recycled, for instance in the case of a closed cycle system in which the exhaust gas leaving the spray drying apparatus is reused as process gas.

A number of conveying lines connect the operational units with each other in a manner known per se and will not be described in detail.

Upstream of the spray drying apparatus 2, a number of operational units for handling incoming process gas are provided. The configuration of such operational units depends on the process gas utilized in the drying plant. In open cycle plants, the process gas is typically ambient air drawn from the surroundings of the drying plant, whereas in the closed cycle or semi-closed cycle plants, the process gas or a part of it is the exhaust gas leaving the drying plant at the downstream end, possibly following subsequent treatment.

In the prior art drying plant shown in FIG. 1, the operational units upstream of the spray drying apparatus 2 include an air room 80 with a filter 81 to which process gas is supplied in the form of ambient air from the surroundings.

In order to pre-heat the process gas, i.a. in order to protect the drying plant from frost, a heat exchanger 61a is coupled to an external heat supply (not shown).

Downstream of the air room 80, another heat exchanger 61b is coupled to an external heat supply (not shown) providing the drying air to be supplied via the primary process gas inlet 22 and into the drying chamber 21 of the spray drying apparatus 2. Such spray drying plants, for example for the production of food powders, are usually quite large energy intensive installations with a high specific thermal energy consumption on a high temperature level of above for example 250° C. The external heat supply for the heat exchanger 61b is typically provided by a primary energy combustion process with high $CO_2$ emissions. The combustion process provides heating energy to a process gas—mostly ambient air—at a temperature as high as needed for the entry into the drying process, mostly between about 150° C. and 230° C., sometimes even higher. The process gas provides the energy to evaporate the solvent—mostly water—during the drying process and leaves the process as warm exhaust gas on a low temperature level of mostly between 65-80° C.

Further heat exchangers 61c, 61d and 61e are provided at the outlet 23 from the drying chamber 21 and at the inlet and outlet ends, respectively, of the fluidizer 24. All of these heat exchangers 61c-61e are also connected to external heat supplies. The heat exchanger 61e is preceded by a heat exchanger 61f coupled to an external cooling supply (not shown) which offers cooling of the air exiting the air room 80 in case the temperature of the air at this stage is too high or if the air needs to be dehumidified.

Further upstream or downstream equipment may be present as well, but is not relevant to the present invention to be described in the following. Any components of the spray drying apparatus 2 as described in detail in the above with reference to FIG. 1 will be referred to in the following, even if not depicted in FIGS. 2 to 8.

Figure 2:
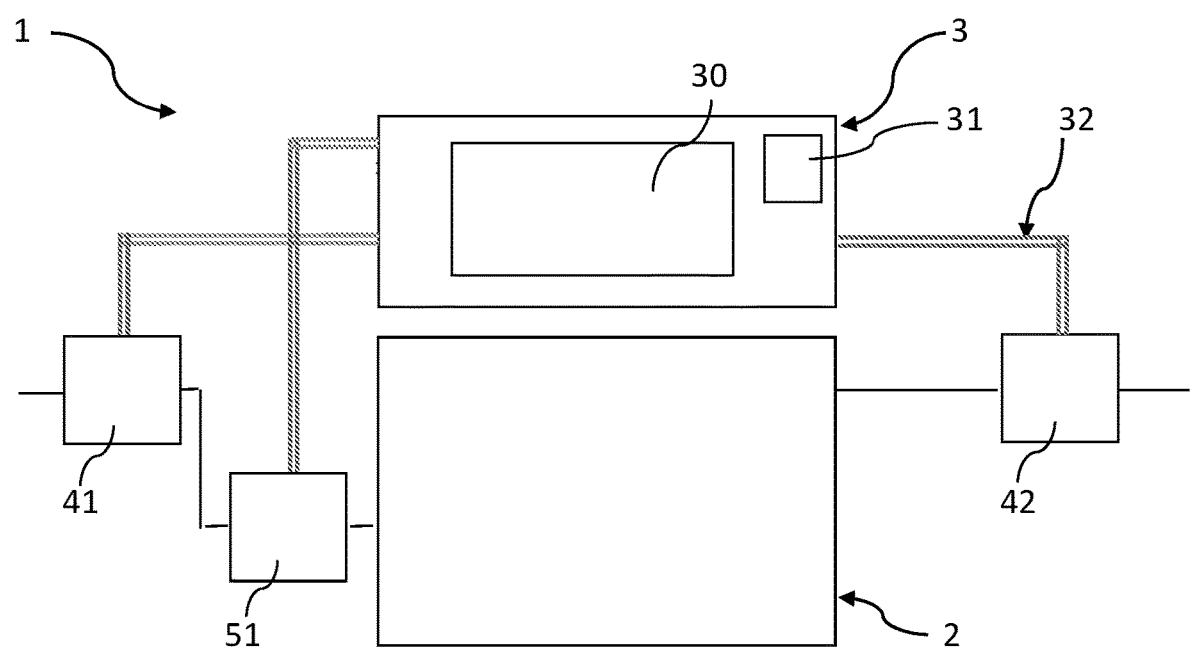
FIG. 2 shows a schematic view of the main components of a drying system in a first embodiment of the present invention.

In FIG. 2, the main components of a drying system generally designated 1 in a first embodiment of the present invention are shown.

The drying system 1 comprises a drying plant generally designated 2, which may comprise a spray drying apparatus as in the prior art drying plant described in the above.

The drying plant 2 is connected to a heat pump assembly 3 including at least one heat pump 30 operating with a cycle gas as primary fluid.

In the drying system 1 of this first embodiment, the heat pump 30 of the heat pump assembly 3 is connected to a control device 31 and via piping 32 as part of a fluid network to two heat sources and one heat sink by means of a number of heat exchangers in said fluid network.

In the embodiment shown, the control device 31 is shown integrated into the heat pump assembly 3, for instance in order to form part of an add-on assembly to be connected with the drying plant as a retrofit appliance. However, the control device may also be provided separately. Correspondingly, the said fluid network or parts of it like the associated piping 32 may also be provided as part of the heat pump assembly 3.

A secondary fluid circulates in the fluid network to provide the heat transfer between the heat sources and the heat sink. The heat transfer fluid may be chosen according to the specific requirements and one example is a water-based solution which presents a high specific heat capacity between approximately 3.0 to 4.19 kJ/kgK while being able to operate between 0° C. and the maximum temperature allowed by the heat pump.

The heat pump assembly 3 comprises at least one high temperature heat pump, the heat pump or heat pumps being able of simultaneously providing chilling energy of a temperature below 20° C. at the respective cold side and heating energy at the respective hot side on different temperature levels for different heat sinks, comprising at least one intermediate level between about 35-90° C. and a high temperature level exceeding 100° C.

The two heat sources of the first embodiment comprise dew point dehumidification of process gas entering the drying plant in a first heat source heat exchanger 41; and recovery of latent and/or sensible heat from exhaust gas leaving the drying plant in a second heat source heat exchanger 42.

The heat sink of the first embodiment comprises pre-heating of process gas used within the drying plant in a first heat sink heat exchanger 51.

Referring now to the further embodiments of the drying system of the present invention, it is noted that elements having the same or analogous function as in the drying plant of FIG. 1 and the first embodiment shown in FIG. 2 carry the same reference numerals throughout, even if variations may be present. Only differences between the embodiments will be described in detail.

Figure 3:
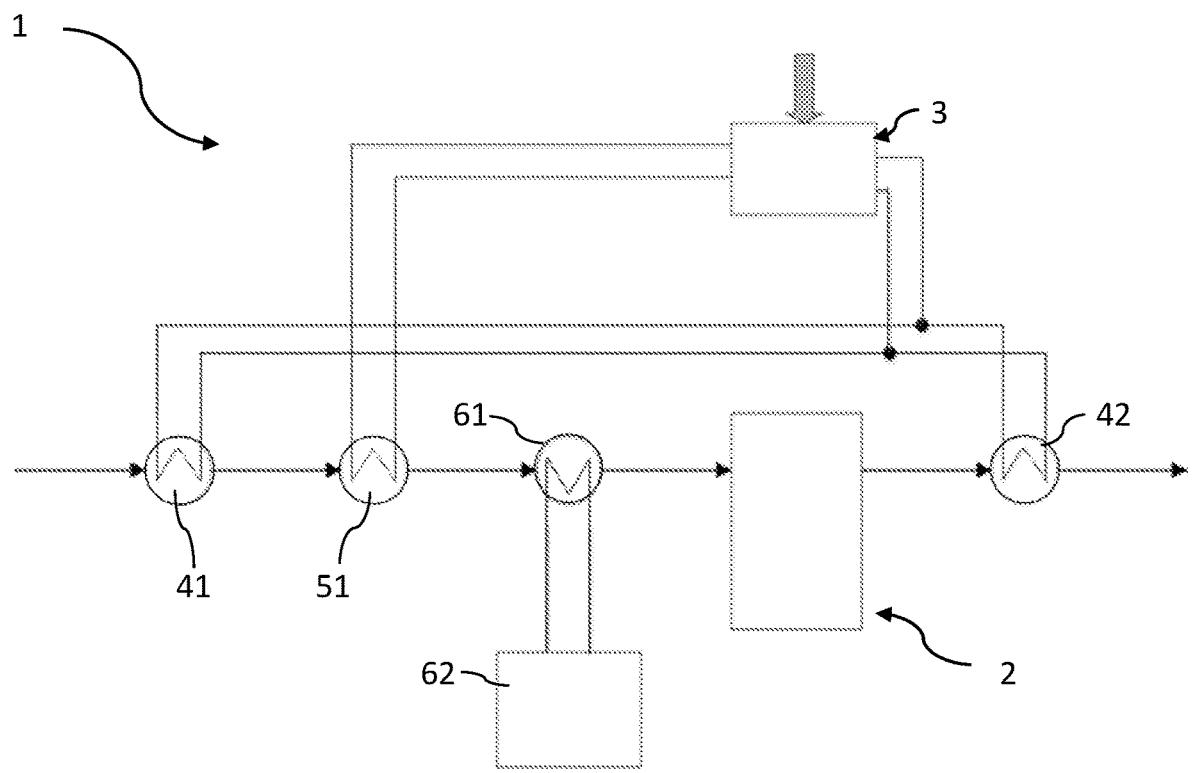
FIG. 3 shows a schematic view of the main components in an open-cycle drying system in a second embodiment of the invention.

In the second embodiment shown in the flow diagram of FIG. 3, the drying system 1 is an open cycle drying system in which dehumidification of the entering process gas is utilized as a first heat source as depicted in the first heat source heat exchanger 41, and the exhaust gas leaving the drying plant 2 is recovered as the second heat source by means of second heat source heat exchanger 42. The heat energy generated by the heat pump assembly 3 is here utilized for pre-heating the process gas in the first heat sink heat exchanger 51. In order to attain the required temperature of the drying gas to be introduced as primary process gas in the drying plant 2, an external heat supply 62 heats the process gas via heat exchanger 61.

Figure 4:
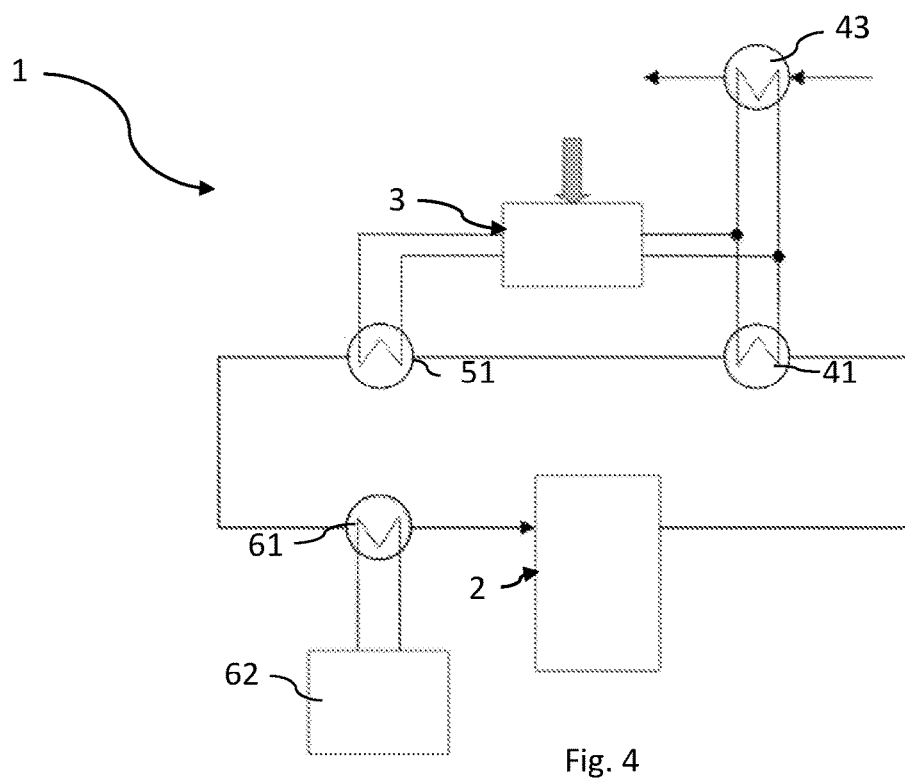
FIG. 4 shows a schematic view of the main components in a closed-cycle drying system in a third embodiment of the invention.

Turning now to the third embodiment shown in FIG. 4, the drying system 1 is a closed cycle system, in which the process gas is adapted to be recycled to the entry of the drying plant. In this embodiment, the two heat sources comprise dehumidification of process gas in a first heat source heat exchanger 41 and an auxiliary stream in a third heat source heat exchanger 43. As in the second embodiment, the heat sink comprises pre-heating of process gas used within the drying plant in first heat sink heat exchanger 51, following which an external heat supply 62 via heat exchanger 61 provides the final temperature rise of the process gas.

Figure 5:
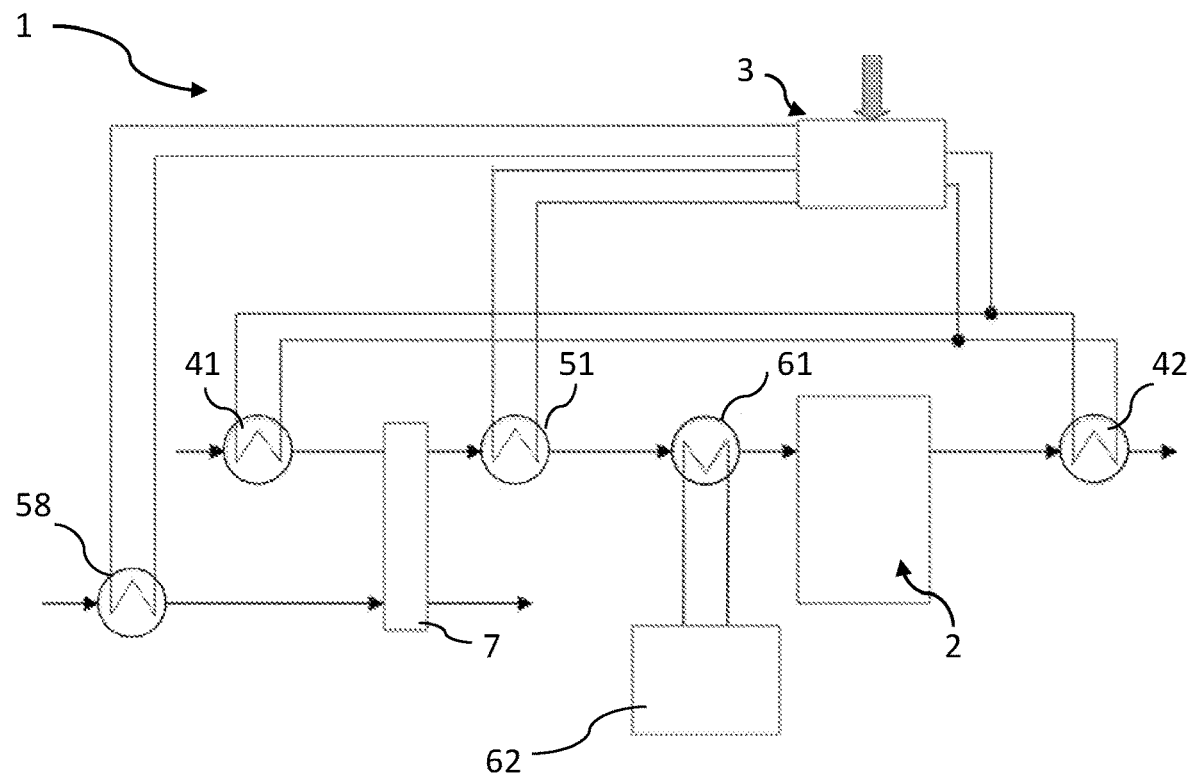
FIG. 5 shows a schematic view of the main components in an open-cycle drying system incorporating a desiccant unit, in a fourth embodiment of the invention.

FIG. 5 depicts a fourth embodiment of the drying system 1 according to the invention. In this drying system, a desiccant unit 7 is provided, for instance comprising a desiccant wheel which is well-known as such. The desiccant adsorbs water from the process gas after a dew point dehumidification. Heat sources include as in the first and second embodiments dew point humidification and exhaust recovery by means of heat exchangers 41, 42. One heat sink is as in the above provided at the pre-heating carried out in heat exchanger 51. Furthermore, a heat sink is provided in the form of heating of air in pre-desiccant heat exchanger 58.

Figure 6:
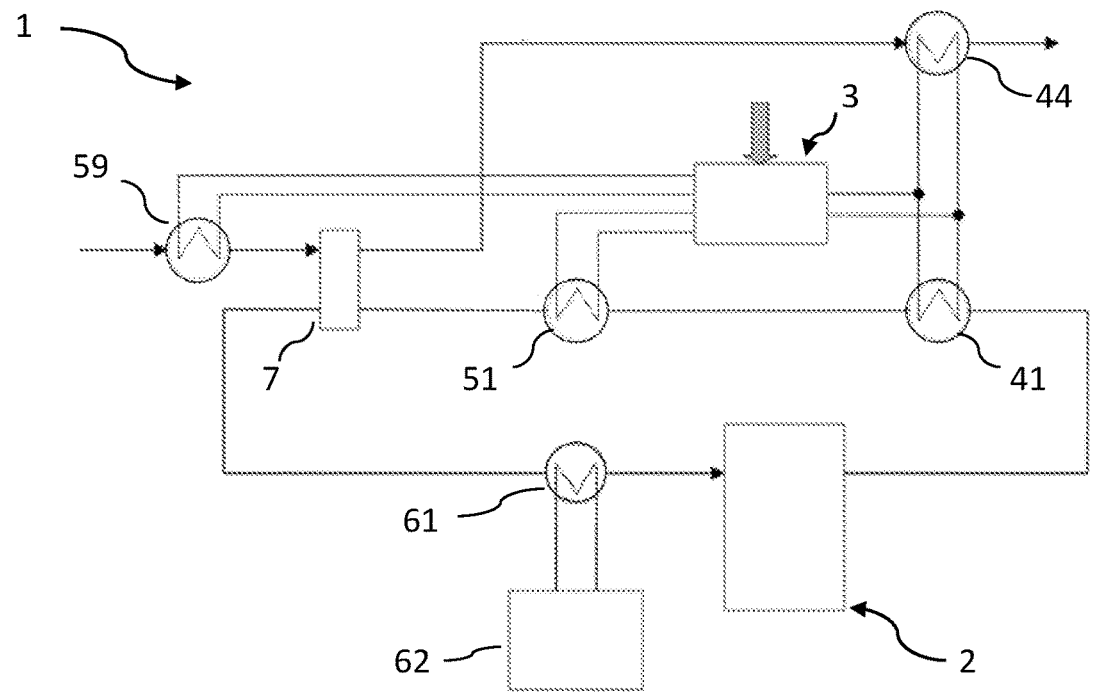
FIG. 6 shows a schematic view of the main components in a closed-cycle drying system incorporating a desiccant unit, in a fifth embodiment of the invention.

In FIG. 6, a fifth embodiment of the drying system 1 includes the components of the fourth embodiment; however, as a closed cycle system. The two heat sources comprise dehumidification of process gas in one heat exchanger 41 and a regeneration air stream from the desiccant unit 7 in another heat exchanger, fourth heat source heat exchanger 44. The heat sink comprises heating of the regeneration air stream to the desiccant unit 7 in pre-desiccant heat exchanger 59.

Figure 7:
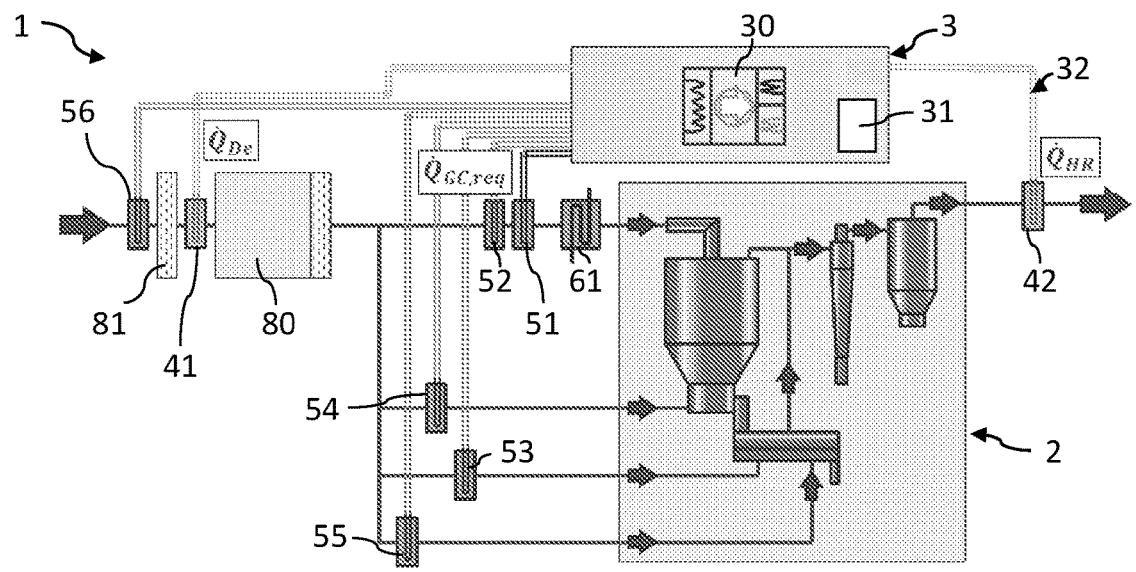
FIG. 7 shows a schematic view of a drying system in a sixth embodiment, incorporating a spray drying plant.
Figure 8:
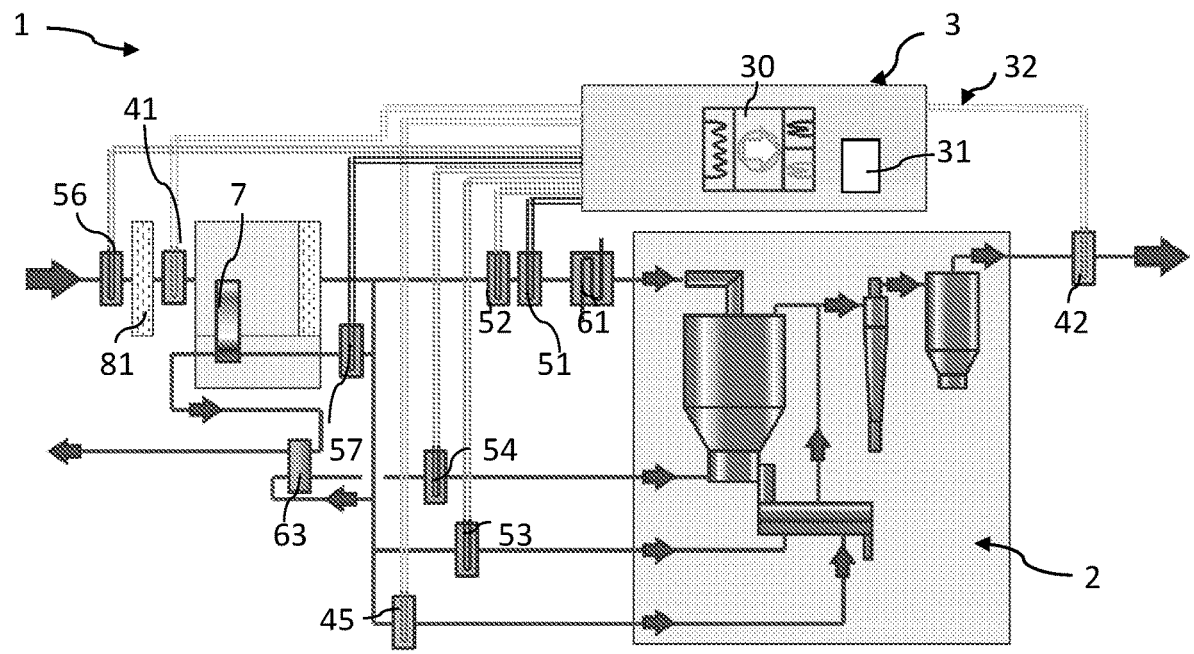
FIG. 8 shows a schematic view of a drying system in a seventh embodiment, incorporating a spray drying plant and a desiccant unit.

In FIGS. 7 and 8, the integration of a heat pump assembly 3 in a drying plant as represented in the prior art spray drying apparatus 2 of FIG. 1 is shown.

In the sixth embodiment of FIG. 7, a number of heat sinks are utilized, namely for pre-heating of the primary process gas inlet 22 for drying gas to the drying chamber 21 by means of heat exchangers 51, 52; as heaters of a side stream for secondary process gas inlet at the outlet 23 from the drying chamber 21 for transportation of dried or semi-dried material by means of heat exchanger 54; and for heating of side streams to a respective end of the fluidizer 24 in a tertiary and quaternary gas inlet by means of heat exchangers 53, 55.

In the seventh embodiment shown in FIG. 8, a further heat source is provided by cooling of a side stream of process gas in a fifth heat source heat exchanger 45.

The person skilled in the art realizes that the present invention by no means is limited to the preferred embodiments described above. On the contrary, many modifications and variations are possible within the scope of the appended claims.

REFERENCE NUMERALS 1 drying system
2 drying plant/spray drying apparatus
21 drying chamber
22 primary process gas inlet
23 outlet of drying chamber
24 fluidizer
25 cyclone
26 bag filter
3 heat pump assembly
30 heat pump
31 control device for heat pump assembly
32 piping for heat pump assembly
41 first heat source heat exchanger
42 second heat source heat exchanger
43 third heat source heat exchanger
44 fourth heat source heat exchanger
45 fifth heat source heat exchanger
51 first heat sink heat exchanger
52 second heat sink heat exchanger
53 third heat sink heat exchanger
54 fourth heat sink heat exchanger
55 fifth heat sink heat exchanger
56 sixth heat sink heat exchanger
57 seventh heat sink heat exchanger
58 pre-desiccant heat exchanger
59 pre-desiccant heat exchanger
61a-f heat exchangers for external heat/cooling in prior art
61 heat exchanger for external heat supply
62 external heat supply
63 external heat exchanger
7 desiccant unit
80 air room
81 filter

The invention claimed is:

1. A drying system comprising:
a drying plant; and
a heat pump assembly, the heat pump assembly comprising at least one heat pump operating with a primary fluid and being connected to at least two heat sources and at least one heat sink by a plurality of heat exchangers in a fluid network, in which a secondary fluid circulates,
wherein the fluid network is configured to be controlled by flow, flow direction, pressure, and temperature in respective parts of said fluid network to manage transfer of heat from each of the at least two heat sources to the secondary fluid, from the secondary fluid to a cold evaporation side of the heat pump, and from any hot side of the heat pump to the secondary fluid, and from the secondary fluid to each of the at least one heat sink in the respective parts of said fluid network, and wherein said at least two heat sources comprise:
dew point dehumidification in at least one of said plurality of heat exchangers of process gas entering the drying plant; and
recovery in at least one of said plurality of heat exchangers of latent and/or sensible heat from exhaust gas leaving the drying plant, and
wherein said at least one heat sink comprises a first heat sink provided in the form of pre-heating in at least one of said plurality of heat exchangers of process gas used within the drying plant.

2. A drying system according to claim 1, wherein an additional heat sink is provided in the form of pre-heating of said process gas in at least one of said plurality of heat exchangers prior to said dew point dehumidification in order to prevent freezing in process gas entry areas.

3. A drying system according to claim 1, wherein an additional heat sink is provided in the form of heating of process gas in at least one of said plurality of heat exchangers for regeneration of a desiccant from a desiccant unit, said desiccant absorbing water from said process gas after said dew point dehumidification.

4. A drying system according to claim 1, wherein cooling of air is provided in an external heat exchanger after regeneration of a desiccant sorbent, said desiccant sorbing a solvent vapor from said process gas after condensation.

5. A drying system according to claim 1, wherein a heat source is provided in the form of cooling of a process gas side stream in at least one of said plurality of heat exchangers.

6. A drying system according to claim 1, wherein the drying plant of the drying system comprises a spray drying apparatus connected to at least one pre-treatment unit and at least one exhaust heat recovery unit.

7. A drying system according to claim 6, wherein the spray drying apparatus comprises a drying chamber with a primary process gas inlet for drying gas connected to at least one of said plurality of heat exchangers and a secondary process gas inlet at an outlet from the drying chamber for transportation of dried material connected to at least one of said plurality of heat exchangers.

8. A drying system according to claim 7, wherein the spray drying apparatus further comprises at least one after-treatment unit provided with at least a tertiary gas inlet connected to at least one of said plurality of heat exchangers.

9. A drying system according to claim 1, wherein the heat pump assembly comprises at least one high temperature heat pump, the at least one high temperature heat pump being capable of simultaneously providing chilling energy of a temperature below 20° C. at a respective cold side and heating energy at a respective hot side on different temperature levels for different heat sinks, comprising at least one intermediate level between about 35-90° C. and a high temperature level exceeding 100° C.

10. A drying system according to claim 1, wherein the heat pump assembly comprises at least one control device for the at least one heat pump and piping connecting the at least one heat pump with the plurality of heat exchangers.

11. A method for integrating a heat pump assembly operating with a primary fluid into a drying plant, resulting in a drying system according to claim 1, said method comprising:
connecting by a plurality of heat exchangers in a fluid network, in which a secondary fluid circulates, a) at least two heat sources, said at least two heat sources comprising dew point dehumidification of process gas entering the drying plant, and recovery of latent and/or sensible heat from exhaust gas leaving the drying plant, respectively, and b) at least one heat sink comprising pre-heating of process gas used within the drying plant, to the heat pump assembly; and
controlling said fluid network by flow and temperature in respective parts of said fluid network to manage transfer of heat from the at least two heat sources to the secondary fluid and from the secondary fluid to the at least one heat sink with a view to optimizing a capacity of the drying plant and a specific energy demand per weight unit of product.

12. The method according to claim 11, wherein the drying system is an open cycle system, and wherein account is taken of absolute humidity and temperature of ambient air at a location of the drying system when optimizing the capacity of the drying plant and the specific energy demand per weight unit of product.

13. The method according to claim 11, wherein the heat pump assembly is provided as a retrofit appliance incorporating a control device and piping, and wherein the method further comprises connecting the piping to the plurality of heat exchangers to form the fluid network.

14. The drying system according to claim 5, wherein the at least two heat sources are configured for cooling and/or pneumatic transport of a final and/or intermediate dried product.

15. The drying system according to claim 8, wherein the spray drying apparatus further comprises a quaternary gas inlet connected to at least one of said plurality of heat exchangers.

16. A method comprising:
providing a drying plant, wherein the drying plant comprises a spray drying apparatus;
providing a heat pump assembly, wherein the heat pump assembly comprises:
at least one heat pump operating with a primary fluid;
at least two heat sources comprising a) dew point dehumidification of process gas entering the drying plant, and b) recovery of latent and/or sensible heat from exhaust gas leaving the drying plant; and
at least one heat sink;
wherein the at least one heat pump is connected to the at least two heat sources and at least one heat sink by a plurality of heat exchangers in a fluid network in which a secondary fluid circulates;
controlling the fluid network by flow, flow direction, pressure, and temperature in respective parts of said fluid network to manage transfer of heat from each of the at least two heat sources to the secondary fluid, from the secondary fluid to a cold evaporation side of the heat pump, and from any hot side of the heat pump to the secondary fluid, and from the secondary fluid to each of the at least one heat sink in the respective parts of said fluid network; and
pre-heating at least one of said plurality of heat exchangers of process gas used within the drying plant.

17. The method of claim 16, wherein heat from said dew point dehumidification and recovery of latent and/or sensible heat occurs in at least one of said plurality of heat exchangers.

18. The method of claim 16, further comprising pre-heating said process gas in at least one of said plurality of heat exchangers prior to said dew point dehumidification in order to prevent freezing in process gas entry areas.

19. The method of claim 16, further comprising heating said process gas in at least one of said plurality of heat exchangers for regeneration of a desiccant from a desiccant unit, said desiccant absorbing water from said process gas after said dew point dehumidification.

20. The method of claim 16, further comprising cooling a process gas side stream in at least one of said plurality of heat exchangers.

* * * * *